July 24, 1951 A. CHEDIAK 2,561,339
APPARATUS FOR LABORATORY INVESTIGATIONS
Filed Jan. 10, 1944 3 Sheets-Sheet 1
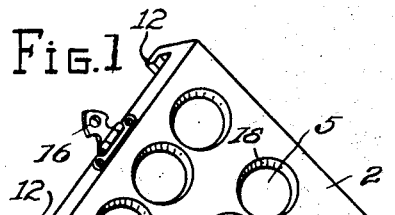
Fig.1
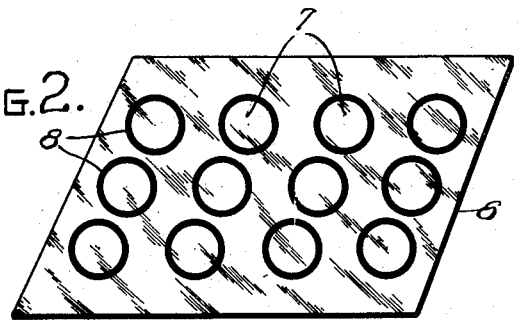
Fig.2
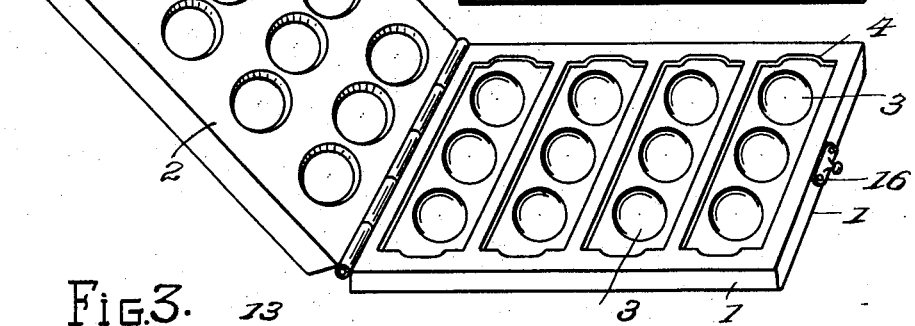
Fig.3
Fig.4
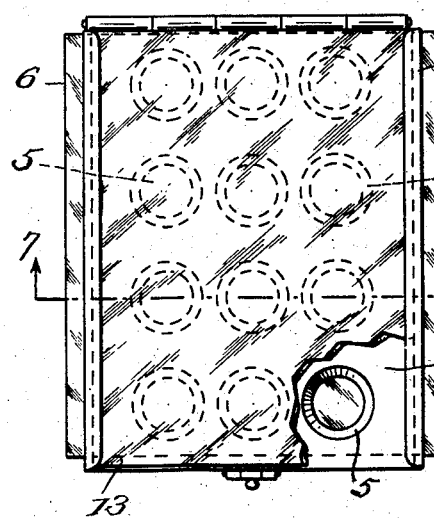
Fig.6
Fig.5
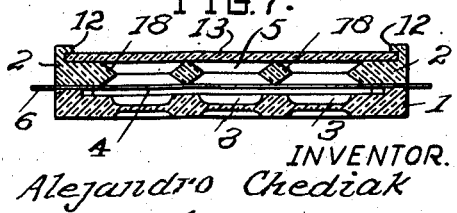
Fig.7
INVENTOR.
Alejandro Chediak
BY
ATTORNEY.

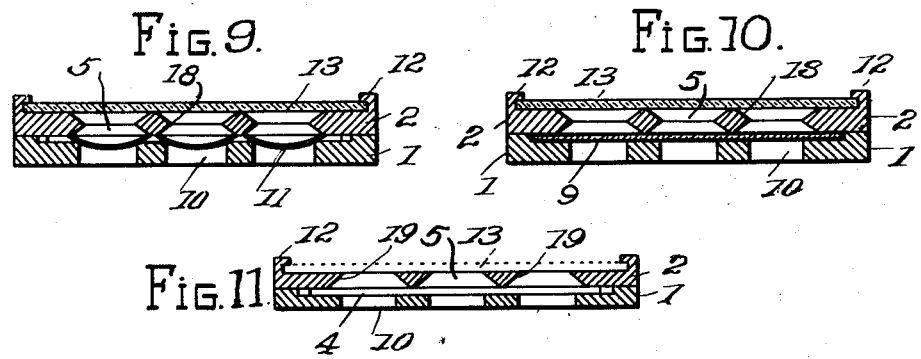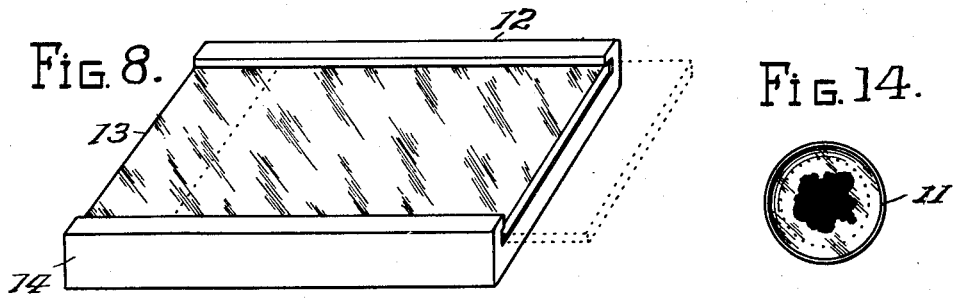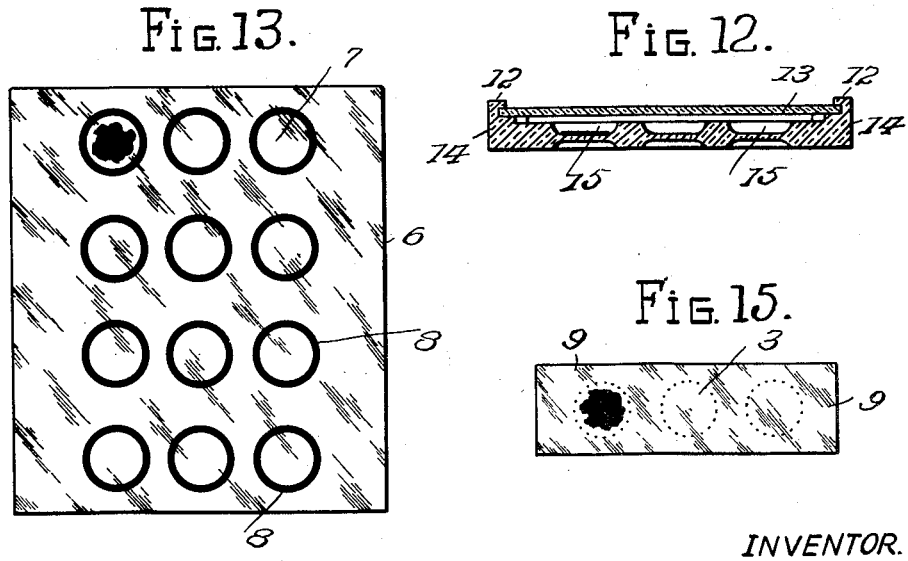

July 24, 1951 A. CHEDIAK 2,561,339
APPARATUS FOR LABORATORY INVESTIGATIONS
Filed Jan. 10, 1944 3 Sheets-Sheet 3
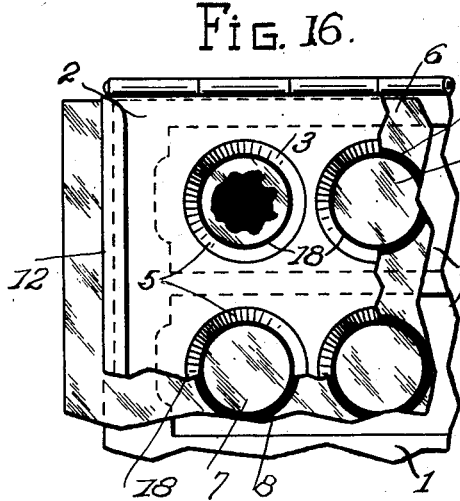
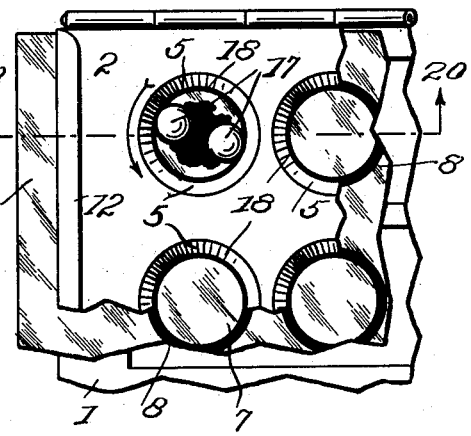
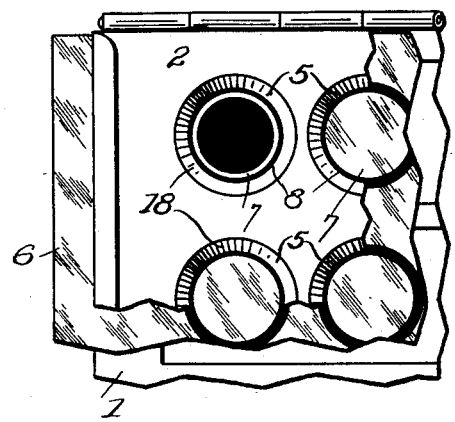
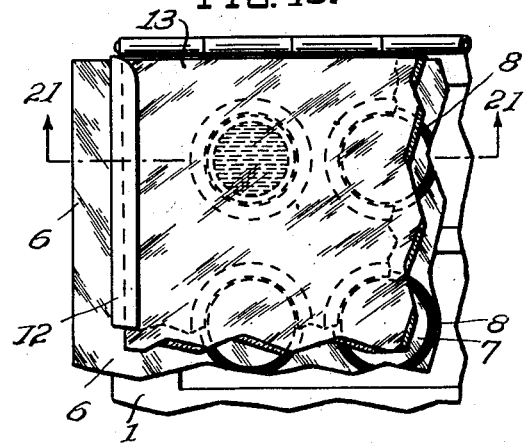
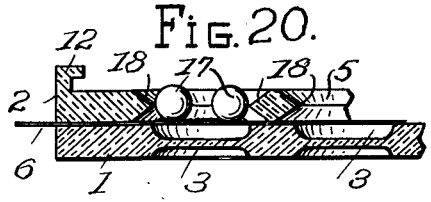
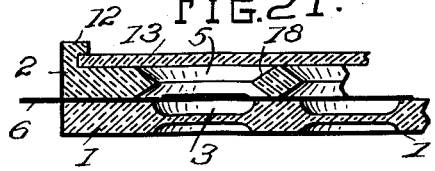
INVENTOR.
Alejandro Chediak
BY
ATTORNEY.

Patented July 24, 1951

2,561,339

UNITED STATES PATENT OFFICE 2,561,339

APPARATUS FOR LABORATORY INVESTIGATIONS

Alejandro Chediak, Habana, Cuba

Application January 10, 1944, Serial No. 517,734

7 Claims. (Cl. 23—253)

This invention is directed to an apparatus for diagnostic or other investigations incident more particularly, but not limited, to microscopic determination in laboratory tests.

The reactions for the diagnosis of syphilis, as in the Wassermann test, that is, the reaction of the deviation of the complement, or in the tests under Kahn, Meinicke, Hinton, Kline, Mazzini, and others, involving the reaction of the precipitation or flocculation, require the use of several centimeters of blood, of which only the serum is utilized, requiring the puncture of a vein, and further requiring that the blood sample be maintained in liquid state, since the sanguineous serum is to be acted on. The applicant has discovered and perfected a process now well known to the scientific world for effecting the diagnostic investigation particularly of syphilis, requiring just one drop of blood, which may be obtained from the lobe of the ear or a finger tip, the drop of blood being allowed to dry, and when required for investigation, adding thereto a required proportion of a known solution and other reagents, if necessary.

The present invention is more particularly concerned with the production of an apparatus for particularly carrying out the diagnostic investigation under the process of procedure devised by the applicant, in the use of which the extraction of any appreciable quantity of the patient's blood is avoided, and the necessity of the use of test tubes, capillary tubes, ampoules, and other apparatus required in other known tests is completely avoided.

The invention has for its primary object the production of a relatively small receiver in which a drop of blood from one or from each of several different patients may be deposited and maintained protected and completely segregated until required for investigation, and in which the various and necessary reagents may be severally introduced and mixed to bring the blood to the required condition at the time of the investigation.

A principal object of the invention is the production of a receiver formed with a plurality of completely segregated saucer-like cavities, independently receptive of a drop of blood for test, thereby permitting the accumulation of samples from several patients in successive order for diagnostic testing at a later period in a more or less continuous operation, to avoid the trouble and delay in obtaining and testing a blood sample of a single patient as a single operation.

A further object of the invention is the provision of cooperative auxiliaries for use with the receiver proper, by means of which the blood samples may be protected and maintained against contamination until required for use.

A further object is the provision of an auxiliary which may be used to cover and protect the material to be tested, which auxiliary may be transparent or with transparent areas to expose the material, and which may be suitably marked in each exposure area to selectively identify each test-material.

The invention is shown in the accompanying drawings by way of illustration of a serviceable apparatus, in which drawings—

Figure 1 is a perspective view of one form of receiver which is transparent.

Figure 2 is a perspective view of a transparent sheet for use with the receiver.

Figure 3 is a perspective view of a transparent cover plate for use with the receiver.

Figure 4 is a perspective view of a specimen and protector plate.

Figure 5 is a perspective view of an individual receiver cup.

Figure 6 is a plan, partly broken away, of the completed receiver of the form shown in Figure 1.

Figure 7 is a section on line 7—7 of Figure 6.

Figure 8 is a perspective view of a modified form of receiver having a single body portion.

Figure 9 is a transverse section of a further form of receiver having an opaque body.

Figure 10 is a similar view of the form of receiver shown in Fig. 9 with the specimen plate.

Figure 11 is a sectional view of a slightly modified form of receiver.

Figure 12 is a transverse section of the receiver shown in Fig. 8.

Figure 13 is a plan of a protector plate showing the material to be investigated in one cavity.

Figures 14 and 15 show in plan the modified forms of protector plates and receiver cup of Figures 4 and 5 respectively, the material to be investigated being shown in place therein.

Figures 16, 17, 18 and 19 are enlarged broken plan views showing the receiver in different conditions of use, the material to be investigated being shown in place in one cavity of each view.

Figure 20 is a transverse section on line 20—20 of Figure 17.

Figure 21 is a transverse section on line 21—21 of Figure 19.

While the apparatus is particularly designed for carrying out the procedure of diagnostic investigation of the process developed by applicant and previously referred to, it is to be understood that such apparatus is of value in other investigations and that any and all such uses are contemplated as within the spirit and scope of the invention.

The receiver is made in two hingedly-connected parts, a base section 1 and a cover section 2, which may be of transparent or opaque material. In the form of receiver shown in Fig. 1, the parts are transparent, as shown in Fig. 7, to permit observation therethrough. The base section is formed with a plurality of material receiving cavities or cup-like receptacles 3, hereinafter termed cups, preferably of circular outline and of shallow depression. These cups which may be in any desired number are preferably arranged in uniform groups in slightly depressed areas 4 of the base. As best shown in Fig. 7, recesses are formed in the bottom of the base 1 beneath the cups 3 to space the bottoms of the cups above the base bottom for protective purposes. The cover section 2 is formed with through openings 5, arranged when the cover is closed to align respectively with and render visible the contents of the cups 3. The edges of the openings 5 are formed in a particular manner to be later referred to.

A thin sheet 6, Figure 2, of transparent material is formed with definite areas 7, defined by colored or other marked margins 8, which areas 7 register with the cups 3 of the base 1 when the sheet 6 is placed thereon. If preferred, and as desired, the areas may have individual markings to provide a record knowledge of the particular material in the cup 3 exposed through such area, to thus permit the use of the receiver for a number of test materials from different patients with proper identification of each. These selective identifications may be any conventional markings and illustration of such is not deemed to be necessary. In some cases, and in more restricted use of the receiver or for any other reason, individual plates 9, Figure 4, of transparent material, each designed to seat in any one of the depressed areas 4 of the base 1 and cover the row of cups 3 in that area, may be used. If desired, the sheet 6 or plate 9 may cooperate with the openings 5 to form specimen receiving chambers.

It is further contemplated that, if desired, the base 1 may be formed of opaque material, and, in place of the cups 3, may be provided with through openings 10, Figure 11, and individual transparent cups 11, Figure 5, adapted to removably seat in such openings for the reception of the material to be investigated. In assembly, as shown in Figure 9, the bottoms of the cups 11 are protectively spaced above the bottom of the base 1. This type of base may also be provided with depressed areas 4, as shown in Fig. 11, for the reception of the plates 9, as shown in Fig. 10.

The cover plate 2 on its uppermost surface is provided with edge guides 12, to slidably receive a transparent cover plate 13, Figure 3, through which the material in the cups is completely visible while at the same time secured against contamination or disturbance, and forming at the same time a damp chamber within the receiver. These damp chambers in the individual cups 3 are formed by the sheet 6 or plates 9 when used.

It is also contemplated to form the apparatus of a single section 14, Figure 12. This section corresponds to the cover section 2 of Figure 1, except that the through openings 5 of that section 2 are now formed as material cups 15, which are protected by the cover plate 13 cooperating with guides 12, as in Figure 1.

As previously stated, the material to be investigated—a drop of blood or other extracted material according to the purpose of the test—is placed in a cup of one or the other forms described, and after material from one or several different patients has been received with its protective and cover plates, if used, is closed and may be secured against accidental opening by any conventional holding or latch means 16, Figure 1. The material, particularly the blood samples, will, or at least may be permitted to dry before opportunity for testing, and will, in testing, require the introduction of desired reagents and the reducing of the mass to a homogeneous more or less fluid form for testing. This reduction may, and preferably is, obtained by introducing into the charged cups one or more balls 17, Figs. 17 and 20, which under appropriate agitation of the receiver in any selected manner, will thoroughly reduce and mingle homogeneously the material in the cup. Before testing, of course, the balls are withdrawn using appropriate instruments as, for example, magnets if the balls are steel. The cover plate 13 may, of course, be removed during application and use of the balls.

In order that under such agitation with the included balls the material will not be forced over the edge of the cup, the edges of the through openings 5 in the receiver cover 2 are of transverse V-form as at 18, Figures 1 and 9, or of downwardly divergent form, as at 19 in Figure 11. The surface of the edge of the opening is thus inclined in both forms against the overflow of the material while being mixed in the use of the balls.

This apparatus, besides being applicable to the examination and investigation in the diagnosis of syphilis, is also suitable for any class of investigations or examinations of the blood, sputum, serum, and any other similar uses, besides being of utility for any reaction in which agglutination or precipitation is concerned, with the advantage that since it can be utilized as damp chamber not only by employing the complete apparatus but also by making use of its lower plate by simply covering it with a lamina, an indefinite length of time is thereby provided for effecting the observation.

This new apparatus may be applied also with the use of a single drop of blood made homogeneous for determining easily the sanguineous group by using spherules, since the quantity of blood which each spherule carries, and which served the purpose of bringing about the homogeneity of the blood, is sufficient when mixed with classifying serums to make possible the determination of the sanguineous group, the investigation of which may be effected by using the cavities of the lower plate or performed in the lamina intercalated between the two principal plates of the apparatus.

Another important application of the apparatus is that it makes possible the carrying out of numerous reactions and investigations at the same time, by making use of each of the cavities of the apparatus for different investigations and intercalating the lamina or laminae which contain the sample of dry blood, above all, by the method of Chediak Microreaction, by means of which a large number of analyses may be made in a very short space of time, whereas by other means the making of such analyses would involve considerable delay.

What I claim is:

1. A laboratory apparatus comprising a flat body portion provided with means forming a plurality of separated cup-like receptacles for the reception of samples, the bottoms of said receptacles being transparent and the under surface of said bottoms being positioned above the bottom plane of said body portion, a cover plate removably mounted on the top of said body portion to cover said receptacles, and means attached to said body portion for holding said cover plate in said receptacle covering position.

2. A laboratory apparatus comprising a pair of plates adapted to be rigidly connected in superposed relation to cooperatively form a body portion, the upper of said plates comprising a plurality of through openings each having a thin peripheral edge, the lower of said plates being provided with means forming a plurality of separated receptacles for the reception of samples and respectively registering with said openings when said plates are superposed, the bottoms of said receptacles being transparent and the under surface of said bottoms being positioned above the bottom plane of said lower plate, and a cover plate removably mounted on the top of said upper plate for covering said openings.

3. A laboratory apparatus comprising a pair of plates adapted to be rigidly connected in superposed relation to cooperatively form a body portion, the upper of said plates comprising a plurality of through openings each having a thin peripheral edge, the lower of said plates having a shallow recess in its upper surface and being provided with means forming within said recess a plurality of separated receptacles for the reception of samples and respectively registering with said openings when said plates are superposed, the bottoms of said receptacles being transparent and the under surface of said bottoms being positioned above the bottom plane of said lower plate, a transparent plate removably mounted in said recess to cover said receptacles, and a transparent cover plate removably mounted on the top of said upper plate for covering said openings.

4. A laboratory apparatus comprising a pair of plates adapted to be rigidly connected in superposed relation to cooperatively form a body portion, the upper of said plates comprising a plurality of through openings each having a thin peripheral edge, the lower of said plates being provided with means forming a plurality of separated receptacles for the reception of samples and respectively registering with said openings when said plates are superposed, the bottoms of said receptacles being transparent and the under surface of said bottoms being positioned above the bottom plane of said lower plate, a thin transparent sheet removably sandwiched between said plates and having areas marked thereon to correspond to and register with said openings and receptacles, and a transparent cover plate removably mounted on the top of said upper plate for covering said openings.

5. A laboratory apparatus comprising a pair of plates adapted to be rigidly connected in superposed relation to cooperatively form a body portion, the upper of said plates comprising a plurality of through openings each having a thin peripheral edge, the lower of said plates having a plurality of shallow recesses in its upper surface and being provided with means forming within said recesses a plurality of separated receptacles for the reception of samples and respectively registering with said openings when said plates are superposed, a transparent plate removably mounted in each of said recesses to cover said receptacles, the bottoms of said receptacles being transparent and the under surface of said bottoms being positioned above the bottom plane of said lower plate, a thin transparent sheet removably sandwiched between said plates and having areas marked thereon to correspond to and register with said openings and receptacles, and a transparent cover plate removably mounted on the top of said upper plate for covering said openings.

6. A laboratory apparatus comprising a pair of transparent plates adapted to be rigidly connected in superposed relation to cooperatively form a body portion, a plurality of cup-like receptacles formed in the upper surface of the lower of said plates, the bottom of said lower plate being recessed beneath said receptacles to space the under surface of the bottoms of said receptacles above the bottom of said lower plate, the upper of said plates having a plurality of through openings corresponding to and registering with said receptacles when said plates are superposed, said openings each having a thin inner peripheral edge, and a transparent cover plate removably mounted on the top of said upper plate for covering said openings.

7. A laboratory apparatus comprising a pair of plates adapted to be rigidly connected in superposed relation to cooperatively form a body portion, a plurality of registering through openings in said plates, a transparent cup-like receptacle mounted in each of said openings in the lower of said plates, the under surface of the bottoms of said receptacles being spaced above the bottom of said lower plate to prevent abrasion and clouding thereof, the openings in the upper of said plates each having a thin inner peripheral edge, and a transparent cover plate removably mounted on the top of said upper plate for covering said openings.

ALEJANDRO CHEDIAK.

REFERENCES CITED

The following references are of record in the file of this patent:

UNITED STATES PATENTS

| Number | Name | Date |
| --- | --- | --- |
| 10,754 | Ball | Apr. 11, 1854 |
| 426,943 | Linn et al. | Apr. 29, 1890 |
| 529,766 | Wheeler | Nov. 27, 1894 |
| 1,153,185 | Allen | Sept. 14, 1915 |
| 1,159,206 | Garhart | Nov. 2, 1915 |
| 1,775,134 | Malsbury | Sept. 9, 1930 |
| 1,839,573 | Merrick | Jan. 5, 1932 |
| 1,975,245 | Zackheim | Oct. 2, 1934 |
| 2,194,131 | Terry | Mar. 19, 1940 |

FOREIGN PATENTS

| Number | Country | Date |
| --- | --- | --- |
| 28,155 | Great Britain | Aug. 25, 1910 |